D. BONNETT.
CULTIVATOR ATTACHMENT.
APPLICATION FILED SEPT. 15, 1908.
944,939.
Patented Dec. 28, 1909.
2 SHEETS—SHEET 1.
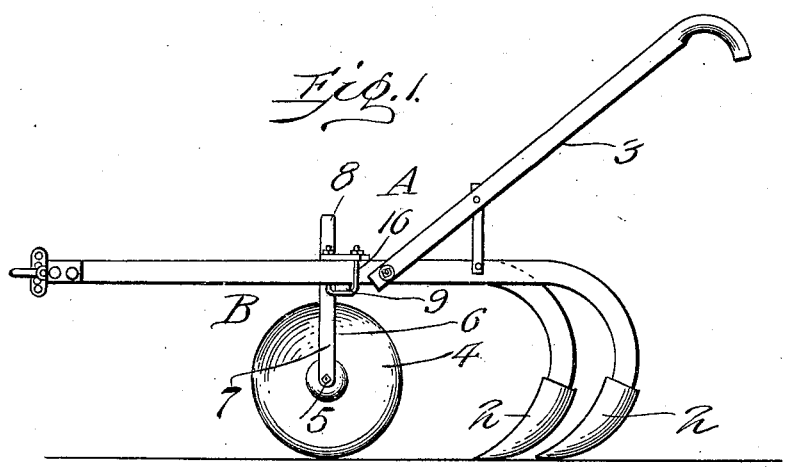
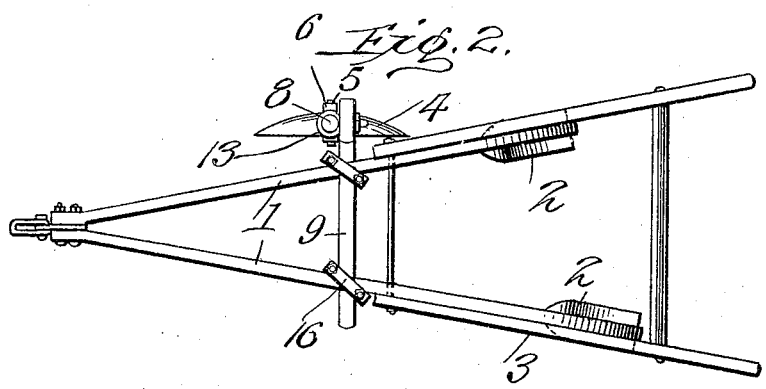
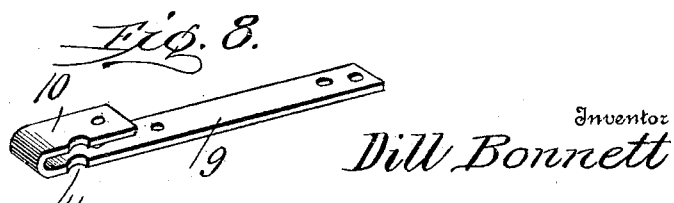
Witnesses
F. F. Tolson
C. Bradway
Inventor
Dill Bonnett
By Victor J. Evans
Attorney D. BONNETT.
CULTIVATOR ATTACHMENT.
APPLICATION FILED SEPT. 15, 1908.
944,939.
Patented Dec. 28, 1909.
2 SHEETS—SHEET 2.
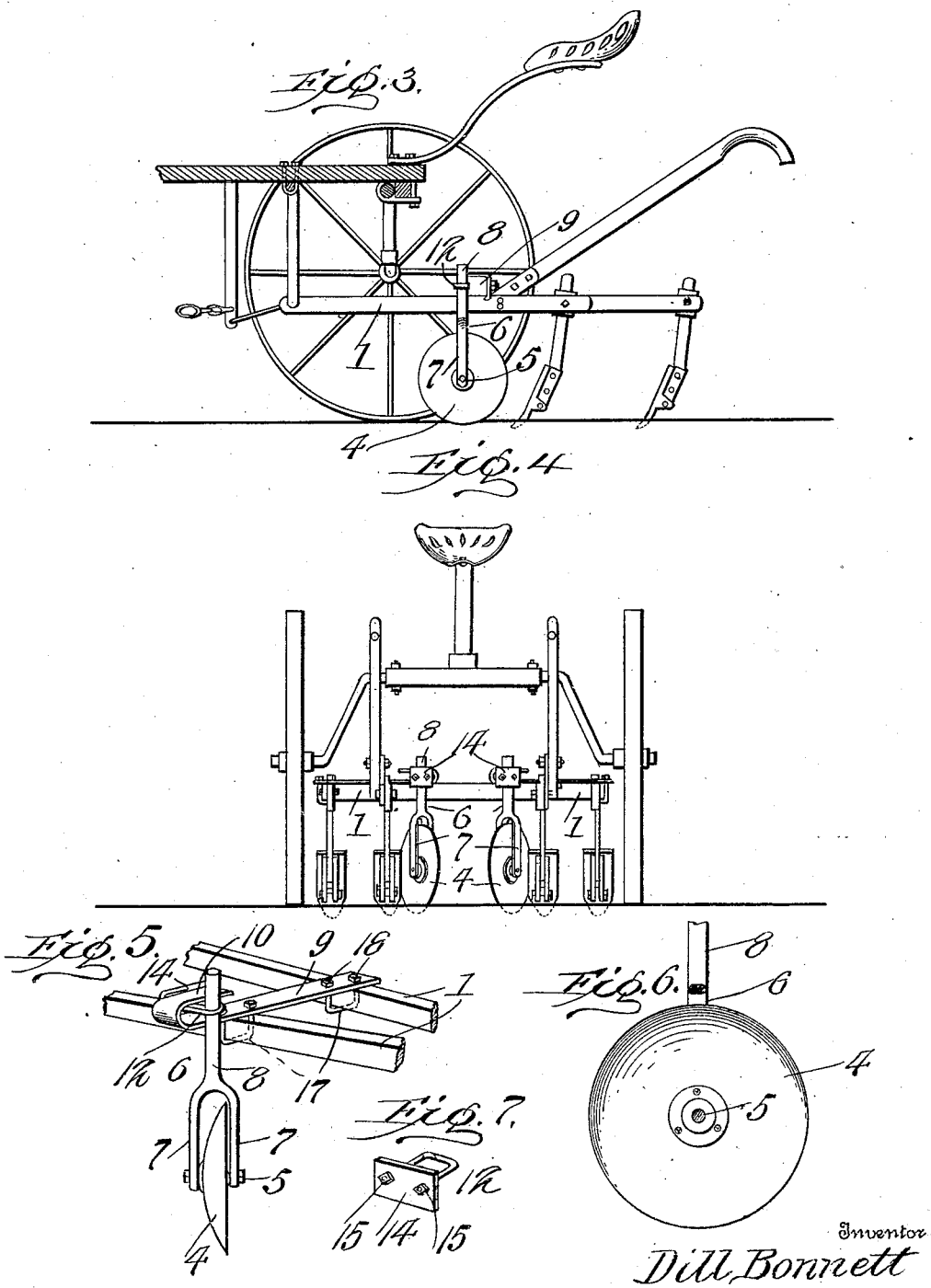

UNITED STATES PATENT OFFICE.

DILL BONNETT, OF McLOUD, OKLAHOMA.

CULTIVATOR ATTACHMENT.

944,939.  Specification of Letters Patent.  Patented Dec. 28, 1909.

Application filed September 15, 1908. Serial No. 453,084.

*To all whom it may concern:*

Be it known that I, DILL BONNETT, a citizen of the United States, residing at McLoud, in the county of Pottawatomie and State of Oklahoma, have invented new and useful Improvements in Cultivator Attachments, of which the following is a specification.

This invention relates to cultivators and more particularly to a disk cutter attachment adapted to be applied to cultivators of ordinary construction to operate in conjunction with the usual shovels or sweeps for efficiently working the soil between the rows of plants to be cultivated.

The invention has for one of its objects to improve and simplify the construction of devices of this character so as to be comparatively simple and inexpensive to manufacture, reliable and efficient in use and so designed as to be used in connection with common cultivators.

Another object of the invention is the provision of a cultivator attachment designed to be applied to the shovel carrying beams or bars and whereby the disk can be set to work at any desired distance from the row and to throw the soil away from or toward the row as desired.

With these and other objects in view, the invention comprises the various novel features of construction and arrangement of parts hereinafter fully described and particularly pointed out in the claim appended hereto.

In the accompanying drawings which illustrate an embodiment of the invention, Figure 1 is a side view of an ordinary double shovel cultivator with the attachment applied thereto. Fig. 2 is a plan view thereof. Fig. 3 is a longitudinal section of sulky cultivator with the attachment applied to the shovel gangs thereof. Fig. 4 is a rear end view thereof. Fig. 5 is a perspective view of the attachment applied to the beams of the cultivator. Fig. 6 is a detail sectional view of the disk fork and disk drawn on an enlarged scale. Fig. 7 is a perspective view of the clamp for securing the fork to the clamping bar or holder. Fig. 8 is a perspective view of a clamping bar or holder.

Similar reference characters are employed to designate corresponding parts throughout the several views.

Referring to the drawings, A designates a cultivator consisting of beams 1 provided with shovels or sweeps 2 and attached to the beams are handle bars 3.

The attachment, designated generally by B, is supported entirely on the shovel carrying beams 1 and consists of a concavo-convex disk or cutter 4 located preferably in front of the foremost shovel of the cultivator. The disk rotates on a horizontal axle 5 supported on a vertically disposed fork 6, the bifurcations 7 of which straddle the disk and the stem or shank 8 secured to a clamping bar or holder 9 extending horizontally across and secured to the beams 1 of the cultivator. The clamping bar 9 consists of a strip of metal that has one end bent back upon itself to form a top member 10 spaced from the body portion of the bar to form spaced abutments against which the stem or shank of the fork is frictionally held. The corresponding edges of the body portion of the clamping bar and of the member 10 thereof are provided with approximately semi-circular notches 11 disposed one above the other for receiving the stem or shank of the fork and the latter is fastened in place by a U-shaped clip 12 as shown in Figs. 5 and 7 or by an eye bolt 13 as shown in Fig. 2, the clip 12 being provided with a rectangular plate 14 which bears against the rear of the clamping bar and against the plate bear nuts 15 on the ends of the clip whereby the parts are firmly secured together. By loosening the nuts 15 the fork can be raised or lowered to set the disk or cutter for shallow or deep penetration into the soil or the fork can be turned to the right or left for changing the angular set of the disk with respect to the row of plants so as to throw the soil toward or away from the latter. The clamping bar 9 may be disposed under the shovel carrying beams 1 of the cultivator and adjustably held in place by clip devices 16, Figs. 1 and 2 which permit the clamping bar to be adjusted forwardly or backwardly on the beams or laterally in a transverse plane to vary the position of the disk with respect to the shovels and the row of plants. In Fig. 5 the clamping bar 9 rests on top of the beams 1 and secured to the latter by clips 17 that respectively straddle the beams and pass through the clamping bars and are provided with nuts 18 on their threaded ends which bear against the top of the clamping bar. When the attachment is applied to any ordinary double shovel cultivator the disk cuts away the weeds and grass in advance of the shovels which turn the same under and leave the soil free and if desired the disk can be set to throw earth toward the plants of the rows when there is not grass and the shovels perform their usual function. In Figs. 3 and 4 the attachment is applied to both gangs of shovels so as to operate upon each side of a row of plants either for cutting away the weeds or throwing the soil away or toward the plants.

From the foregoing description, taken in connection with the accompanying drawings, the advantages of the construction and of the method of operation will be readily apparent to those skilled in the art to which the invention appertains and while I have described the principle of operation of the invention, together with the apparatus which I now consider to be the best embodiment thereof, I desire to have it understood that the apparatus shown is merely illustrative and that such changes may be made when desired as are within the scope of the claim appended hereto.

Having thus described the invention, what is claimed as new is:—

In a cultivator, the combination of transversely spaced beams provided with shovels, a clamp-bar arranged transversely of the beams having an end portion extended and folded upon itself to provide a member spaced from and parallel with the body portion of said clamp-bar, said member and the body of the clamp-bar having vertically alined semi-circular notches in their edges, clips connecting the clamp-bar and beams, a round stem seated in said semi-circular notches and adjustable both vertically and angularly therein, and a fastening for securing the stem to the member and body of said clamp-bar and arranged in the space formed between said parts.

In testimony whereof I affix my signature in presence of two witnesses.

DILL BONNETT.

Witnesses:
O. E. GRECIAN,
W. H. HOLLIS.